Sept. 2, 1924.
R. H. BERKLEY
MESH MACHINE
Filed July 13, 1923
1,506,880
2 Sheets-Sheet 2
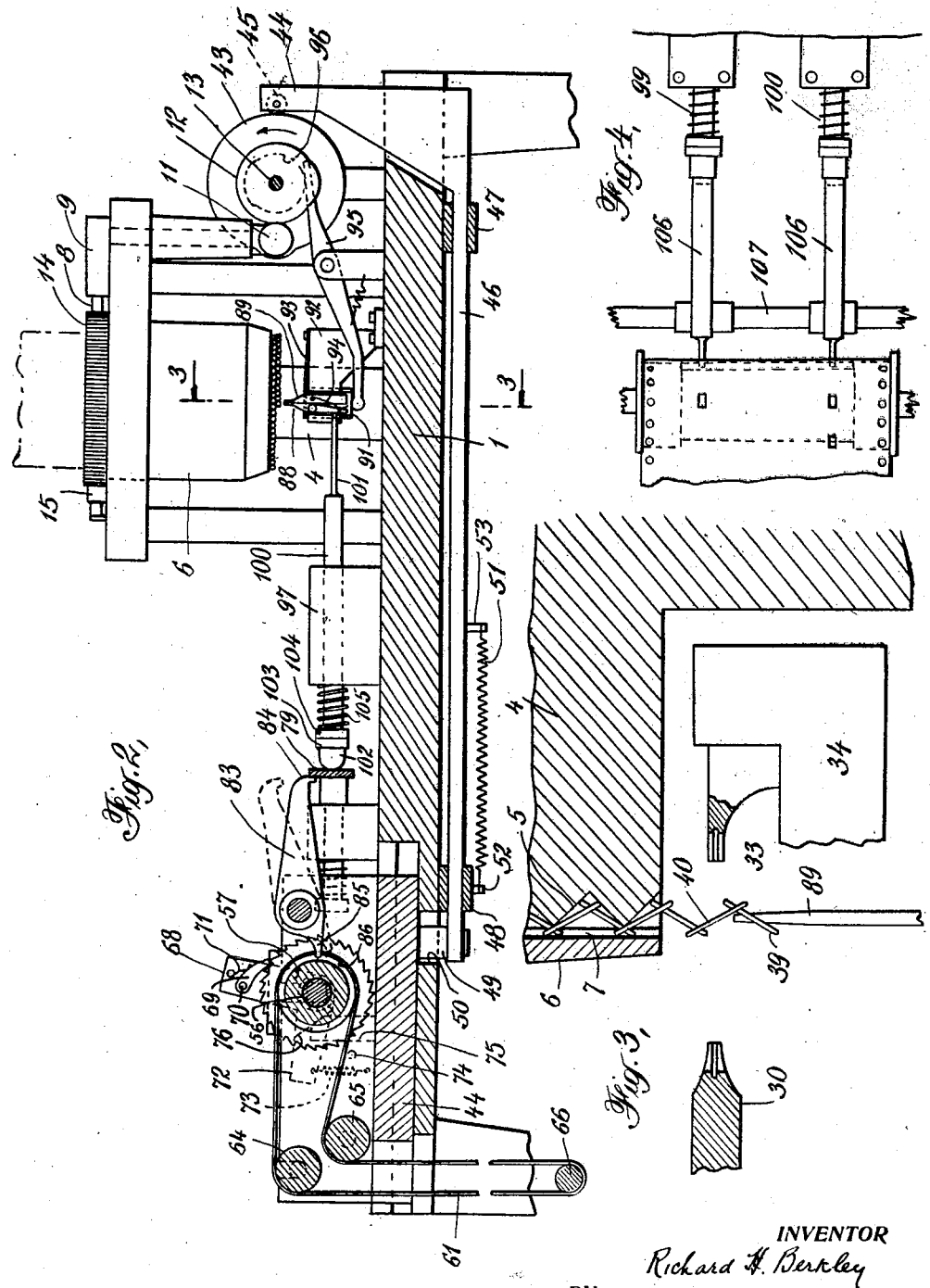
INVENTOR
Richard H. Berkley
BY
Pennie, Davis, Marvin & Edmonds
his ATTORNEYS Patented Sept. 2, 1924.

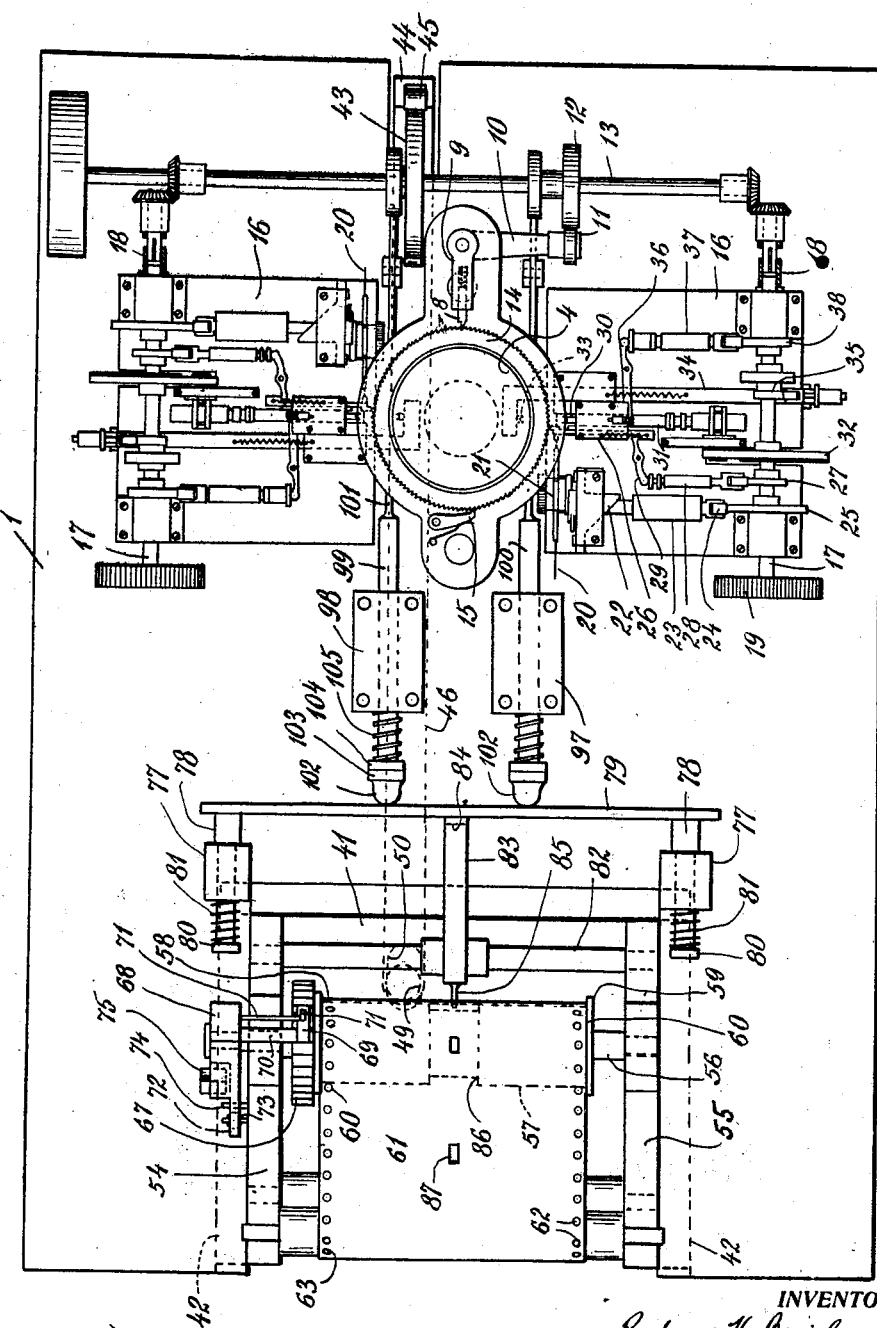

1,506,880

UNITED STATES PATENT OFFICE.

RICHARD H. BERKLEY, OF PLAINVILLE, MASSACHUSETTS, ASSIGNOR TO WHITING & DAVIS COMPANY, A CORPORATION OF MASSACHUSETTS.

MESH MACHINE.

Application filed July 13, 1923. Serial No. 651,272.

*To all whom it may concern:*

Be it known that I, RICHARD H. BERKLEY, residing at Plainville, in the county of Norfolk, State of Massachusetts, have invented certain new and useful Improvements in Mesh Machines; and I do hereby declare the following to be a full, clear, and exact description of the invention, such as will enable others skilled in the art to which it appertains to make and use the same.

This invention relates to machines for making link mesh fabric, especially such mesh as is commonly used in the manufacture of ladies' hand bags and purses. More specifically this invention relates to a mesh machine which produces mesh and which, at the same time, acts on certain of the links in such a way that they may readily be removed from the main body of mesh. By such removal, the mesh is divided into pieces according to the outline of the article which is to be made from it and the machine, therefore, produces mesh which need not be cut manually in the desired shapes.

In mesh making machines now in use the mesh is made either in the form of a sleeve or in the form of a flat web. The machine illustrated in Patent No. 948,615, issued to A. C. Pratt, February 8, 1910 is of the sleeve type and this machine operates to draw a length of wire from a supply, bend it into the form of a staple, insert the legs of the staple through two links of the next preceding row of finished links, and then bend the ends of the staple to form a closed link. Two link forming devices, acting simultaneously add the links successively to each side of the sleeve which is supported on a cylindrical mandrel.

Other machines designed to produce flat webs of mesh are also in use, but the operation of adding links to the mesh is, in general, similar to that described. In either case, the links are not solid, but are in the form of open rings, the ends of which are in close abutment. To complete the mesh, it is ordinarily subjected to a finishing process to close the ends of the rings by soldering, and to facilitate this process, the wire used for the links has incorporated in it, a small amount of solder. The pieces of mesh taken from the machine are, accordingly, given a heat treatment, so that the solder in the ends of the rings will soften, pass into the minute spaces between the ends, and so by uniting produce continuous unbroken links.

In the use of mesh for articles of manufacture, it has been the practice heretofore to cut the mesh into pieces of the desired design or shape, by hand. The operator produces the outline by cutting links one by one with scissors or other similar tool, counting the links along the outline as he proceeds. This manual operation is necessarily slow and laborious and requires much skill and attention to produce perfect designs.

The object of the present invention is to provide a machine for producing mesh in which smaller pieces are outlined in such a way that they may be readily removed from the main body either prior to or after the heat treatment. The mesh may be made either in the form of a sleeve or a flat web, and appropriate tools operate on selected links just after they have been added to the main body of mesh and expand these links so as to open the ends slightly. The links so bent remain in the main body of the mesh until the latter is removed from the machine but when this piece of mesh is subjected to the heat treatment the links which have been expanded or spread will not solder. When the heat treatment is finished the piece of mesh may be shaken and the expanded links will fall out. This acts to sever pieces of the desired outline from the main portion of the mesh and these pieces are then used at once in the manufacture of hand bags.

In this machine link expanding devices are associated with each forming tool and when the forming tools have finished the link, the expanding devices enter it. The action of these devices, however, is controlled so that only selected links may be opened. After the expanding has taken place the devices are retracted and the operation of the forming tools continues, the tool movements being so coordinated as not to interfere with each other. The expanding devices are continuously operated so as to enter each link as it is formed, but links are expanded only in accordance with a predetermined pattern. This control mechanism includes an actuating device which is operative only when a link is to be expanded and the action is carried on by means of a tape provided with perforations spaced in accordance with the pattern. By using an endless master pattern the expanding effect which produces the outline or design in the mesh may be continuously repeated throughout the operation of the machine, and the pieces produced are formed accurately and without variation. By carrying on the operations of mesh making and pattern forming in a single machine the mesh so produced will be ready for the fabrication immediately after the heat treatment. Accordingly, this eliminates the tedious manual operations of producing the design and, furthermore, produces designs which are identical throughout the mesh, thereby insuring that the material will be most economically used in subsequent manufacture.

The combined machine may operate either to produce sleeve or flat mesh but in the accompanying illustrations there has been shown, for convenience, a combined machine for making sleeve mesh with the designs formed in it during production.

In these drawings Fig. 1 is a plan view of one embodiment of the device,

Fig. 2 is a longtiudinal section thereof,

Fig. 3 is a transverse vertical section on the line 3—3 of Fig. 2.

Fig. 4 is a plan view of a detail of a modification of the pattern forming mechanism.

In these drawings the mesh making mechanism is similar to that shown and described in Patent No. 1,317,926 issued to A. C. Pratt, October 7, 1919. As the operation of the link forming tools is there described in detail only a brief explanation of their operation will now be given.

The machine is shown mounted on a table or bed 1 and consists of a pair of link forming units which are disposed on either side of an upright stationary mandrel 4 which rests on the table, and a portion of the surface of which is provided with a spiral groove 5 shown more clearly in Fig. 3. Enclosing the mandrel and supported in a suitable frame, as illustrated in Fig. 2, is a sleeve 6 which has a series of alternate ridges and depressions extending vertically on its inner surface, indicated generally at 7. The individual links of the mesh are engaged in these depressions and in the spiral groove in such a way that when the sleeve 6 is rotated, it carries the mesh along with it and in such movement the mesh is moved upwardly of the mandrel by reason of the pitch of the spiral. This arrangement of parts, accordingly, serves to support the mesh and to move it so that new links may be added. The sleeve 6 is moved by means of a spring-pressed pawl 8 mounted in a swinging lever 9 operated by a second lever 10 which carries a cam follower 11 bearing against a cam 12 on the main driving shaft 13. The pawl 8 engages ratchet teeth in a ring 14, attached to the upper end of the sleeve 6 and a spring-pressed stop pawl 15 is provided to prevent retrograde movement of the sleeve.

The two link forming assemblies are identical and each is mounted on a plate 16 so that it may be removed and replaced as a unit if any of the parts should require adjustment. Referring now only to one unit, the various tools, etc., are driven from a shaft 17, connected with the main shaft 13 through a clutch 18, and provided with a hand wheel 19 so that the various parts may be set in the proper positions manually when operations are to begin. The wire 20 from which the links are made is drawn from a source of supply (not shown) and is fed through suitable guides by means of rollers 21. The rollers are given a stepwise movement by means of a pawl and ratchet device operated by a slide 22 which is in turn moved by a rod 23 having a cam follower 24 bearing against cam 25 on shaft 17. This cam moves the rod 23 to reciprocate the slide 22 and thus feeds the wire in the desired lengths. A length of wire sufficient for one link is fed in each forward movement of the rod 23.

A wire cutting device indicated generally at 26 is operated at the proper instant to cut the length of wire so fed, and is actuated by a cam 27 on the shaft 17 through a rod 28 and a pivoted arm 29. This cutting device not only serves to cut the wire but also to support the piece cut until it is engaged by the die and its associated parts. This die 30 is actuated by a rod 31 moved by a cam 32 on shaft 17 and the die moves forward, engages the length of wire and bends it about an anvil into the form of a staple. When the wire is so bent, the anvil (not shown) moves downwardly out of the path of travel of the die and the latter moves forward to insert the legs of the staple through a pair of links of the completed mesh. In such movement the ends of the staple bear against an inner die 33 on a rod 34 which has been moved to position by the cam 35. This co-operation of the two die members forces the ends of the staple together so as to produce a closed ring, and when this operation is complete the several parts of the die are restored to their normal positions by means of a pivoted lever 36 actuated by the rod 37 which is driven by the cam 38. The movements of the several parts thus briefly described is so coordinated that, upon the sleeve 6 moving forward by one step the several operations incident to adding a link are carried on, then the sleeve advances the mesh one step, and another link is added. In the machine illustrated in the drawings two link forming units are used, and consequently two links will be added in each period of rest. The finished mesh is moved about and upwardly of the mandrel 4 as the links are added and the several operations are repeated to produce such an amount of mesh as is desired.

As shown in Fig. 3 the links of successive rows incline in opposite directions but the centers of these links 39, 40 lie in a cylindrical surface. The inclination to be given these links upon their release by the dies 30 and 33 is produced by appropriate means not illustrated, and these links then hang in position to be entered by the expanding tools operated by mechanisms now to be described.

As has previously been mentioned, the outline which is to be given the pieces of mesh so that they may be used without further cutting in the fabrication of bags or other articles, is produced by expanding links at desired points so that these links may be readily removed from the fabric, thus creating a piece of the desired shape. This operation of forming a design by expanding appropriate links is carried on by mechanism, the greater portion of which is illustrated at the left in Figs. 1 and 2. The principal parts of this mechanism, are mounted on a slide 41 which is movable in suitable guide ways 42 in the table 1 and given a reciprocating movement toward and away from the link forming tools by means of a cam 43 on the main shaft 13. This cam serves to move a bell crank lever 44, in the short upright arm of which is a cam roller 45 bearing against the face of the cam 43. The long arm 46 of the bell crank is supported in sleeves 47 and 48 located on the underside of the table, and at the remote end, the arm 46 is attached to a stud 49 connected with the slide 41 and projecting through an aperture 50 in the table 1. A spring 51 attached at one end to a lug 52 mounted on a sleeve 48 and at the other end to a pin 53 mounted on the arm 46 insures that the slide 41 will be returned to its original position.

On either side of the slide 41 are upstanding walls 54 and 55 and mounted across these walls is a shaft 56 on which is supported a roller 57 free to revolve. This roller has a pair of flanges 58 and 59 at either end and adjacent these flanges there project from the surface of the roller two series of sprocket teeth 60. Wound around the roller 57 is the master pattern 61 which is in the form of an endless tape or band having marginal perforations 62 and 63 which are entered by the sprocket teeth 60. This tape or band 61 is also supported by rollers 64 and 65 mounted to rotate freely in suitable bearings formed in the walls 54 and 55. These rollers serve to guide the unused portion of the band and the slack is held taut by means of a weight roller 66 which is supported by a loop of the band.

As has been explained, the shaft 56 is supported against rotation across the walls 54 and 55, but the roller 57 is free to rotate upon it. Attached to one end of this roller and also freely rotatable on the shaft is a ratchet wheel 67, and mounted to move freely on the end of the shaft 56 adjacent the ratchet and overlying the table 1, is a bell crank 68. The upper arm of the bell crank which is nearly vertical in its position of rest, shown in Fig. 2, is provided with a pawl 69 mounted on the arm 70 rigidly secured in the bell crank 68. A spring 71 also mounted in this arm of the bell crank acts on this pawl and holds it in engagement with the teeth of the ratchet wheel 67. The lever arm 72 of the bell crank has attached to it one end of a spring 73, the other end of which is attached to the table 1, and located in the wall 54 beneath this arm of the bell crank is a stop pin 74. Mounted on the table 1 and extending upwardly therefrom is a cam post 75 which strikes against a cam surface 76 formed on the lower arm of the bell crank and the construction is such that when the slide 41 is moved to the right (see Fig. 2) the spring 73 will swing the bell crank so as to move the pawl over the teeth of the ratchet 67. When the slide moves to the left the cam surface on the post 75 will strike the surface 76, raise the lower arm of the bell crank and so rock the pawl forward so as to rotate the ratchet and with it the roller 57. This action advances the pattern by one step.

Mounted in suitable bearings 77 on the bed 1 are guide posts 78 connected by an operating bar 79. Each of these guide posts has an enlarged end 80 between which and the adjacent face of the bearings 77 is a spring 81 encircling the post, these springs having a tendency to move the posts and the operating bar to the left as shown in the drawings. The movements of this bar to the right actuate the expanding devices, as will later be described, and such movements are produced by the action of the slide 41 under the control of the pattern 61. This control is exercised as follows: Mounted to rock on a shaft 82 is a trip lever 83, one end 84 of which is adapted to make contact with the bar 79 when the lever is appropriately moved. The other end of the lever 83 is provided with a finger 85 which normally bears against the face of the pattern 61 as it is moving over the face of the roller 57. This roller will be seen to be provided with a central circumferential groove 86 into which the finger 85 would normally project but for the interposition of the pattern. This pattern is provided with suitable perforations 87 which are placed so as to lie over the groove 86. Accordingly when the pattern is moved so that a perforation lies opposite the finger 85, this lever will drop down to the full line position shown in Fig. 2 where the end 84 will bear against the bar 79. During the reciprocations of the slide 41 when the lever 83 is permitted to drop down to such position the bar 79 will be moved to the right against the pressure of the springs 81 and this movement will be transmitted to the link expanding mechanism. If, however, the perforations in the pattern are not in the proper positions, the lever 83 will be maintained in the broken line position shown in Fig. 2 and the reciprocation of the slide will not be transmitted to the bar 79. It will thus be seen that the movements of this bar 79 are controlled by the perforations in the pattern, and these perforations may be placed so that the link expanding devices will act on the links at any desired point in the mesh. The pattern control not only insures that the expanding devices will operate with absolute accuracy, but also makes certain that in repetition of the pattern the pieces cut will be identical in shape.

There is provided one expanding device for each link forming mechanism, and each of these devices consists of a pair of jaws 88 and 89 placed vertically and mounted on suitable pivots on a slide 91 movable in a bracket 92 mounted on the bed of the machine. A leaf spring 93 bears down on the upper end of this slide and tends to maintain it in its lowermost position. A second leaf spring, one end of which is fixed on one jaw, presses against the other jaw so as to maintain the upper ends of the jaws in contact. A pivoted lever 95 bears at one end against the lower end of the slide 91 and at the other against a cam 96 mounted on a shaft 13. As this shaft rotates the slide 91 is carried upward and the ends of the jaws as shown in Fig. 3 will enter into the link which has just been released by the dies. This upward movement takes place at the completion of the link forming operation and the slide is restored to the normal position before the piece of mesh is moved about for insertion of a new link.

Mounted in suitable bearings 97 and 98 on the table 1 are actuating rods 99 and 100, each of which has an end 101 of reduced diameter bearing against the lower end of the jaws 88. These actuating rods are identical and only one need be described. At the opposite end, the rod 100 is provided with a cushion 102 disposed in such position as to be engaged by the bar 79 in its movement, and this cushion 102 is provided with an adjusting nut 103 and a lock nut 104 so that the extent of the movement of the rod 100 produced by the movements of the bar 79 may be accurately determined. This adjustment also controls the amount by which the jaws 88 and 89 may be spread apart and therefore determines the extent to which the links will be opened. Encircling the rod 100 and bearing at one end against the block 97 and at the other against the nut 104 is a spring 105 tending to maintain the rod 100 with its small end out of engagement with the jaw 88.

The operation of the several parts is as follows: when the link forming tools have added a link to the mesh this link falls down to the inclined position illustrated at 39 in Fig. 3. Thereupon the lever 95 moves the slide 91 upwardly to insert the ends of the jaws 88 and 89 into this link. Following such movement the slide 41 moves to the right and, if the link is one which is to be opened in accordance with the design to be formed, a perforation of the pattern 61 will have moved to such a position as to permit the finger 85 to enter it, thus permitting the lever 83 to drop down so that its end 84 will be in a position to strike the bar 79. Accordingly the advance movement of the slide will cause the bar 79 to be moved to the right, and this bar will then engage the cushion on the ends of the actuating rods, forcing these rods to the right so that the small ends will engage the jaws and swing these jaws on their pivots so as to expand the link by the proper amount. When this expanding operation has taken place, the slide 41 moves backwardly and the springs 105 carry the actuating rods out of engagement with the jaws. The jaws then close and the slide 91 is permitted to be restored to its lower position by the spring 93. The usual cycle of operations of the link forming mechanism now continues, the mesh being advanced one step and another link added at the appropriate point. In the return of the slide the pawl 69 advances ratchet 67 by a step, thereby advancing the pattern. If the next ring is also to be opened, another perforation will be in proper registry so as to be entered by the finger 85, thus permitting the lever 83 again to drop down so as to engage the bar 79 upon the further advance of the slide 41. The ends of the jaws 88 and 89 will again be opened to expand this link, and will then be closed and removed from this link. The cycle of operation as described is continued as the mesh is formed and the rings which are to determine the outline of the piece will be expanded at the proper intervals.

If the design is to be changed so as to produce outlines of a different form, another pattern is substituted having perforations punched in the locations necessary to produce the desired effect, and the operation with any particular type of pattern is similar to that which has just been described.

In the mechanism illustrated in Fig. 1 both link expanding devices are actuated simultaneously to produce a similar pattern on each side of the sleeve of mesh, but it is possible to make use of a pattern which produces different outlines at each side of the mesh by means of a modified form of device illustrated in Fig. 4. In this form the pattern is shown to have two rows of perforations each of which controls a lever 106 mounted to swing on a shaft 107. These levers are similar in general to the lever 83 previously described, but instead of contacting with a bar 79 each lever contacts directly with the end of one of the actuating rods 99 and 100. It is thus possible to make use of a pattern in which the rows of perforations are not identical since each row directly controls an expanding device. The construction and operation of the various other parts which are to be used in connection with the modified form illustrated in Fig. 4 are similar in all respects to the construction and operation of the parts shown in the principal embodiment of the invention.

While I have illustrated a mesh machine for producing mesh in the form of a sleeve, with designs formed therein by expanding links, it is evident that there would be no difficulty in including the link expanding action in a machine producing mesh in the form of a flat web. In either form, the essential features are the same, that is, there is an expander device which enters the links added to the mesh, but the expanding action of such devices is selectively controlled by a pattern so that only such links as desired are expanded for ready removal. Also, it is clear that instead of the expander jaws which bend a link to prevent its soldering, it is also possible to make use of cutting tools which cut the link, thus permitting it to drop out of the fabric at once, instead of being shaken out at some later time. In the present embodiment, the expanding tools have been shown which enter each link after it is added to the mesh. The invention, however, is intended to include a device in which the jaws are inserted only into the links which are to be expanded, in which case the inserting means will be controlled by the pattern.

I claim:

1. A machine for making link mesh fabric comprising means for supporting a piece of mesh, means for adding links successively thereto, and means for acting on certain of the links added to permit their ready removal.

2. A machine for making link mesh fabric comprising means for supporting a piece of mesh, means for adding links successively thereto, means for acting on the links so added to permit their ready removal and means to control the action of the last mentioned means.

3. A machine for making link mesh fabric comprising means for supporting a piece of mesh, means for adding links successively thereto, expanding means, entering the links added, and means for selectively actuating the expanding means to expand certain of these links.

4. A machine for making link mesh fabric comprising means for supporting a piece of mesh, means for adding links successively thereto, a link expanding device, means for inserting the device into the links added, and means, operable in accordance with a predetermined pattern to actuate the device to expand selected links.

5. A machine for making link mesh fabric comprising means for supporting a piece of mesh fabric, means for adding links successively thereto, a link expanding device, means for inserting the device into the links added, means for actuating the device to expand the links so entered, and pattern means for controlling the action of the actuating means.

6. A machine for making link mesh fabric comprising means for supporting a piece of mesh fabric, means for adding links successively thereto, a link expanding device, means for inserting the device into the links added, means for actuating the device to expand the links so entered, drive means for the actuating means, and means interposed between the drive and actuating means for controlling the expanding action in accordance with a predetermined pattern.

7. A machine for making link mesh fabric comprising means for supporting a piece of mesh, means for adding links successively thereto, means for acting on the links so added to permit their ready removal, and selector means for determining the links to be expanded.

8. A machine for making link mesh fabric comprising means for supporting a piece of mesh, means for adding links successively thereto, link expanding means reciprocable into and out of operative position, means for actuating said expanding means, and a pattern for controlling said actuating means.

9. A machine for making link mesh fabric comprising means for supporting a piece of mesh, means for adding links successively thereto, a link expanding device adapted for entering the links added to the mesh, means for actuating the device when it has entered a link, and a pattern intermittently moving, and operable, during predetermined periods of rest, to render said actuating means operative.

10. A machine for making link mesh fabric comprising means for supporting a piece of mesh, means for adding links successively thereto, separable jaws, means for causing these jaws to enter the links added and selectively controlled means for separating the jaws to expand certain of the links entered.

11. A machine for making link mesh fabric comprising means for supporting a piece of mesh, means for adding links successively thereto, separable jaws, means for causing these jaws to enter the links added, means for opening the jaws to expand the link entered and means for controlling the opening means.

12. A machine for making link mesh fabric comprising means for supporting a piece of mesh, means for adding links successively thereto, jaws movable to enter the links added to the mesh, and pattern-controlled means for opening the jaws to expand selected links so entered.

13. A machine for making link mesh fabric comprising means for supporting a piece of mesh, means for adding links successively thereto, separable jaws, means for inserting the jaws into the links added, means for opening the jaws to expand the links entered, means for actuating the opening means and means for controlling the actuating means.

14. In a machine for making link mesh fabric, a pair of jaws mounted on a slide, means for moving the slide to insert the jaws into the links of the mesh, means for opening the jaws to expand the links entered and means for controlling the opening means.

15. In a machine for making link mesh fabric, a pair of jaws, means for inserting the jaws into the links added to the mesh, means for opening the jaws to expand the links entered, means for actuating the opening means, a member for operatively connecting the actuating and opening means and means for controlling such action of the member.

16. In a machine for making link mesh fabric, a pair of jaws, means for inserting the jaws into the links added to the mesh, a reciprocable rod adapted to open the jaws to expand the link entered, means for actuating the rod, a member movable to establish an operative connection between the rod and the actuating means, and a pattern for controlling the movements of said member.

17. In a machine for making link mesh fabric, a pair of jaws, means for inserting the jaws into the links added, means for opening the jaws to expand the links, and means for selectively actuating the opening means, including a pattern having perforations therein corresponding to the links to be expanded.

18. In a machine for making link mesh fabric, a pair of jaws, means for inserting the jaws into the links added, means for opening the jaws to expand the links, and means for selectively actuating the opening means, including a pattern movable step by step as each link is added to the mesh, a lever resting on the pattern and perforations in the pattern permitting the lever to move to position to operate said actuating means.

19. In a machine for making link mesh fabric, a pair of jaws, means for inserting the jaws into the links added, means for actuating the jaws to expand the links entered, means for driving the actuating means, and means for controlling the actuating means, including a pattern movable step by step as links are added, a lever resting on the pattern and movable to establish an operative connection between the actuating and driving means, and perforations in the pattern permitting the lever to make such movements.

20. In a machine for making link mesh fabric, a pair of jaws, a rocking lever to insert the jaws in the links added to the mesh, a member operable to open the jaws to expand the links, a reciprocating slide, means for transmitting the movements of the slide to the member to actuate the latter, and a pattern on the slide for controlling the transmitting means.

21. In a machine for making link mesh fabric, a pair of jaws, a rocking lever to insert the jaws in the links added to the mesh, a member operable to open the jaws to expand the links, a reciprocating slide, a pattern on the slide and movable step by step as links are added to the mesh, a lever resting on the pattern and perforations in the latter permitting the lever to swing to a position to transmit to the member the movements of the slide.

22. In a machine for making link mesh fabric, a pair of jaws mounted on a slide, a swinging lever moving the slide to insert the jaws in the links added to the mesh, a member for opening the jaws to expand the links, a second reciprocable slide, a pattern mounted thereon and movable stepwise as the slide reciprocates, a lever resting against the pattern and perforations in the pattern permitting the lever to move to actuate the member as the second slide moves.

23. In a machine for making link mesh fabric, the combination with means for supporting a piece of mesh and means for adding links successively thereto, of jaws, associated with the link-adding means, for entering the links added, means for actuating the jaws to expand the links, a slide movable to drive the actuating means, and a pattern for controlling the operative connection of the slide and actuating means.

24. In a machine for making link mesh fabric, the combination with means for supporting a piece of mesh and a plurality of means for adding links successively thereto, of a pair of jaws associated with each link-adding means for entering the links added, means for opening the jaws to expand the links, means for operating the opening means in unison and a pattern for controlling the operating means, to open selected links.

25. In a machine for making link mesh fabric, the combination with means for supporting a piece of mesh and a plurality of means for adding links successively thereto, of a pair of jaws associated with each link-adding means for entering the links added, means for opening the jaws to expand the links, means for operating each opening means and a pattern for controlling each operating means to open selected links.

26. In a device of the class described, the combination with expander means for entering the links added to the mesh and actuating means for causing such expander means to expand the links of a reciprocating slide, an intermittently rotated roller on said slide, a perforated pattern led over the roller, and a pivotally mounted trip lever resting against said pattern and movable, when a perforation registers with the end thereof, to establish an operative connection between said slide and said actuating means.

27. In a device of the class described, the combination with expander means for entering the links added to the mesh and actuating means for causing such expander means to expand the links entered, of a reciprocating slide, a roller on the slide given a stepwise rotation as the slide reciprocates, a peripheral groove in the roller, a perforated pattern led over the roller with a stepwise movement as the latter rotates, the perforations in said pattern being disposed over said groove, a trip lever pivotally mounted on the slide and bearing against the pattern, said lever being movable when a perforation registers with the end thereof, to transmit the movement of the slide to the actuating means to expand the link entered.

In testimony whereof I affix my signature.

RICHARD H. BERKLEY.